Aug. 31, 1965   E. R. GROTNES   3,203,213
APPARATUS AND METHOD FOR REFORMING SHELLS
Filed May 10, 1961   8 Sheets-Sheet 1

INVENTOR.
EUGENE R. GROTNES
BY Harold D. Jones
ATTORNEY

Aug. 31, 1965    E. R. GROTNES    3,203,213
APPARATUS AND METHOD FOR REFORMING SHELLS
Filed May 10, 1961    8 Sheets-Sheet 2

FIG.3

INVENTOR.
EUGENE R. GROTNES
BY Harold D Jones
ATTORNEY

FIG.4

Aug. 31, 1965  E. R. GROTNES  3,203,213
APPARATUS AND METHOD FOR REFORMING SHELLS
Filed May 10, 1961  8 Sheets-Sheet 4

*INVENTOR.*
EUGENE R. GROTNES
BY Harold D Jones
ATTORNEY

INVENTOR.
EUGENE R. GROTNES
BY Harold D Jones Jr
ATTORNEY

Aug. 31, 1965    E. R. GROTNES    3,203,213
APPARATUS AND METHOD FOR REFORMING SHELLS
Filed May 10, 1961    8 Sheets-Sheet 6

INVENTOR.
EUGENE R. GROTNES
BY Harold D Jones Jr
ATTORNEY

INVENTOR.
EUGENE R. GROTNES
BY
ATTORNEY

FIG.17

United States Patent Office 3,203,213
Patented Aug. 31, 1965

3,203,213
APPARATUS AND METHOD FOR REFORMING SHELLS
Eugene R. Grotnes, Atlanta, Ga., assignor to Atlanta Grotnes Machine Company, Atlanta, Ga., a partnership
Filed May 10, 1961, Ser. No. 109,207
11 Claims. (Cl. 72—82)

This invention relates to the reformation of shells or blanks of sheet metal or other material, and more particularly to an improved apparatus and method for forming a neck in one end of sheet metal shells to be used for cans and other types of containers.

Although there are many industrial requirements for the reforming of cylindrical shells of sheet metal, one of the most common requirements is for the forming of necks in cylindrical shells during the production of large cans for paint and other materials. In essence, the "necking in" operation performed to meet this requirement consists of reducing the diameter of the cylindrical shell in that portion which is adjacent to an end of the shell. Often the shell end is flanged during the same operation so that after the operation, the end of the shell contains a neck of reduced diameter and a flange.

The neck and flange are used to fasten a closure such as a container bottom or top to the shell or blank. The circular closure is typically a cylinder having a length which corresponds to the length of the neck in the shell and an exterior diameter which is just sufficiently less than the interior diameter of the shell neck to permit one end of the closure to be snugly inserted into the neck of the shell. The other end of the closure is generally flanged so that after insertion of the closure into the shell, the flange of the closure and the flange of the shell are contiguous. These contiguous flanges are used to form a seam or joint which securely fastens the closure to the shell, and the result is a closed or partially closed container end having a diameter which is less than the diameter of the container proper.

The advantages of cylindrical containers having one or both ends of reduced diameter are several. However, the most significant advantage is the fact that cans and other containers having "necked in" bottoms are easily stacked for storage or shipment with the reduced diameter bottom of one container nesting in the larger diameter of the top of another container. This advantage in itself has resulted in a large demand for containers having "necked in" ends and for methods and apparatus to efficiently perform the operations necessary for the production of such containers.

Most of the arrangements of apparatus used to form necks in sheet metal shells involve one or more sets of dies. In some arrangements, one set of dies is laterally expanded inside the shell to firmly engage a circumferential area of the inner surface of the shell and another set of dies is laterally contracted against the outer surface of the shell in the same circumferential area. The faces of the inner dies have a contour which in profile is substantially identical to that desired for the neck in the shell and the faces of the outer set of dies have a contour which will cooperate with the face contour of the inner set of dies and force the neck into the shell. It is apparent that when the outer and inner sets of dies are brought together with the shell between them, a neck will be formed in the shell having a configuration defined by the die faces.

Opposing die faces forming a complete circle within and without the shell can also be utilized to form necks in shells by forcing the shell between the stationary die faces. Since the die faces do not move to expand or contract during the forming operation, this arrangement will avoid crimps in the shell caused by gaps between the faces of an expanded inner set of dies. However, this last method is impractical when the neck is to be formed at other than an end of the shell or when an end flange is desired in association with the neck. Moreover, in both of these apparatus arrangements there is a tendency for metal spring back to cause the neck to expand in diameter upon the release of the pressure exerted by the outside set of dies.

Another very common arrangement of apparatus used to form necks in shells utilizes the expanding inner set of dies already described with a smaller outer die which does not surround the shell and which engages the circumference of the outer surface of the shell a portion at a time to form a neck in conjunction with the contour of the faces of the inner die set. The outer die can be moved around the circumference of a stationary shell or the shell and inner set of dies can be rotated against a spinning, but stationary, outer die.

However, the rotation of the shell while forming a neck in the shell makes it difficult to obtain an exact neck diameter. This is because the rotating shell tends to flair or become elliptical in cross section during rotation with the result that the outer die indents the circumference of the shell more in some places than in others. Moreover, some metal spring back is found in either method of forming necks in shells with a small outer die even if the outer die is made to engage the total circumference of the shell several times in an effort to eliminate spring back and its effect on neck diameter.

The foregoing difficulties in obtaining exact neck dimensions in shells are inherent in the various methods and arrangements of apparatus currently in general use for the forming of necks in shells. There is also a difficulty in obtaining required shell neck diameters which is the result of the manufacturing methods used by the container industry and which existing arrangements of apparatus can not readily overcome. This difficulty stems from the fact that for economic reasons, container manufacturers prefer to form closures for a particular size of container with the same dies regardless of the gauge of metal being used. As a result, the outside diameter of that portion of the closure which is inserted into the neck of the shell is larger with heavy gauge metal than with light gauge metal.

Thus, if the closure dies and neck diameter are designed for light gauge metal bottoms, bottoms of heavy gauge metal will be difficult to insert into the neck of the shell, and if the closure dies and neck diameter are designed for heavy gauge metal bottoms, bottoms of light gauge metal will not fit snugly into the neck of the shell. Therefore, it is readily apparent that a method and apparatus for forming necks in shells for containers must not only be capable of forming necks of a specific dimension, but must also be capable of accommodating small adjustments in the specific diameter of the shell neck without utilizing a completely different set of dies for the necking operation.

The invention described herein completely eliminates all of the foregoing difficulties in the forming of necks in shells for containers since it not only produces a shell neck having exactly the dimension desired, but provides for adjustment to vary the dimensions of the neck in order to accommodate closures of various metal gauges while using the same set of dies. Essentially, this is accomplished by initially forming a neck in the shell whose diameter is less than that desired and then expanding the neck to exactly the diameter desired. This expansion of the neck diameter is always greater than that which would result from metal spring back and is sufficient to remove any tendency of the neck to be elliptical because of the rotation of the shell during the initial forming of the neck with a stationary outer die. Required variations in the diameter of the neck necessary to accommodate closures of various gauge metals are obtained by adjusting the amount of neck expansion.

A significant feature of the apparatus described herein is its ability to form necks in shells or blanks in the foregoing manner and the ease with which adjustment for different neck diameters is achieved. However, the apparatus is readily adaptable to a wide variety of applications and in every application the apparatus will provide an efficient means for reforming cylinders with dies having various face configurations. Significantly, the reforming is not limited to the end of the shell or blank and may involve all or any part of the circumference of the shell.

Moreover, the apparatus is highly durable and easy to maintain and its principal reforming functions are positively controlled by camming surfaces. In addition, the apparatus occupies a minimum of space considering the high production rates of which it is capable. Therefore, although the apparatus is described herein with reference to a particular improved method of forming necks in containers, it possesses many advantages equally adaptable to other production operations.

These and other features of the invention will be more clearly understood from the following detailed description and from the accompanying drawings in which like characters designate corresponding parts in all figures and in which.

These figures and the following detailed description disclose a preferred specific embodiment of the invention, but the invention is not limited to the details disclosed since it may be embodied in other equivalent forms.

The apparatus and the method for forming necks 20 and flanges 21 in sheet metal shells 22 can be most easily understood by considering the apparatus to be basically comprised of four related parallel circular platforms. These platforms are concentric about a cylindrical vertical central shaft 23 and positioned one above the other. The lower-most platform 24 is stationary during the operation of the apparatus and can be integral with any suitable base structure 25 for the apparatus. At its center this lower stationary plaform 24 is structurally integral with an inner cylinder 26, and it is through the center of this inner cylinder 26 that the central shaft 23 passes to be held in a vertical position which is generally perpendicular to the plane of the lower stationary platform 24.

The uppermost platform 27 is also stationary during the operation of the apparatus and is integral at its center with an inner cylinder 28 through the center of which passes the central shaft 23 in a direction generally perpendicular to the plane of this upper stationary platform 27. It is evident that the central shaft 23 positions the plane of the upper stationary platform 27 with reference to the plane of the lower stationary platform 24 so that these two platforms 24 and 27 are parallel.

The lower end 29 of the central shaft 23 is fixedly positioned with respect to vertical motion of the shaft 23 and the distance between the two staionary plaforms 24 and 27 can be changed by sliding the upper stationary platform 27 on the central shaft 23 with reference to the position of the lower stationary platform 24 and locking the upper stationary platform 27 in position on the shaft. Vertical motion of the lower stationary plaform 24 is prevented if the lower stationary platform 24 is integrally associated with the same housing 25 which fixedly positions the lower end 29 of the central shaft 23 or by keying the inner cylinder 26 of the lower stationary platform 24 to the central shaft 23.

Support for the upper stationary platform 27 in addition to that from the central shaft 23 is provided by extending peripheral shafts 30 between the two stationary platforms 24 and 27 at equidistant intervals around the circumference of the apparatus. The lower ends 31 of these peripheral shafts 30 are securely held in channels 32 in an outer cylinder 33 which is integral with the lower stationary platform 24 at its outer circumference 34, and the upper portions 35 of these peripheral shafts 30 pass slidably through channels 36 in an outer cylinder 37 which is integral with the upper stationary platform 27 at its outer circumference 38. The fact that these peripheral shafts 30 are slidably associated with the upper stationary platform 27 insures that the peripheral shafts 30 will not inhibit the vertical movement of the upper stationary platform 27 with reference to the lower stationary platform 24 while assisting the central shaft 23 in maintaining the parallel positions of the two stationary platforms 24 and 27 and while by themselves maintaining the two stationary platforms 24 and 27 in a fixed radial position with respect to each other.

Two movable circular platforms are positioned between the two stationary platforms 24 and 27. The lower movable platform 39 is integral at its center with an inner hollow cylinder 40 which has an inside diameter sufficiently large to permit it to slide over the outside of the upper portion 41 of the inner cylinder 26 of the lower stationary platform 24. Vertical movement of these two inner cylinders 26 and 40 with respect to each other is prevented by a flange 42 and lock ring 43. However, a suitable bearing arrangement 44 is provided between the two inner cylinders 26 and 40 so that the inner cylinder 40 of the lower movable platform 39 and the lower movable platform 39 will rotate freely about the inner cylinder 26 of the lower stationary platform 24 and the central shaft 23.

The upper movable platform 45 is associated in a similar fashion with the upper stationary platform 27. This is accomplished by providing the upper movable platform 45 with a hollow inner cylinder 46 which is rotatably mounted about the outside of the inner cylinder 28 of the upper stationary platform 27. A suitable bearing arrangement 47 is provided between these two inner cylinders 28 and 46 for free rotation of the upper movable platform 45 about the central shaft 23, but a lock ring 48 and flange 49 prevents vertical movement of the inner cylinders 28 and 46 and hence of the two upper platforms 27 and 45 with respect to each other.

During operation of the apparatus the movable platforms 39 and 45 rotate about the central shaft 23 as a unit and this joint motion is achieved by using intermediate shafts 50 joining the two movable platforms 39 and 45. These intermediate shafts 50 are equidistantly placed around the central shaft 23 and the upper end 51 of each intermediate shaft 50 is fixedly fastened to the upper movable platform 45 and the lower end 52 of each slidably extends through a suitable fitting 53 in the lower movable platform 39. The intermediate shafts 50 not only tie the movable platforms 39 and 45 together for rotating motion, but because they are slidably movable at one end 52, they permit the upper movable platform 45 to move vertically when the upper stationary platform 27 is moved along the central shaft 23 with reference to the two lower platforms 24 and 39.

From the foregoing, it is apparent that the four circular platforms 24, 27, 39 and 45 provide an apparatus having two lower platforms 24 and 39 fixedly associated with each other in regard to vertical movement and two upper platforms 27 and 45 fixedly associated with each other in regard to vertical movement, but that the vertical distance between the two upper platforms 27 and 45 and the two lower platforms 24 and 39 can be conveniently changed. Since it is between the upper movable platform 45 and lower movable platform 39 that shells 22 are placed when the apparatus is in operation, this platform arrangement provides a convenient means for adjusting the apparatus to accommodate shells 22 of various lengths.

Moreover, it is apparent that the four platforms 24, 27, 39 and 45 are so related that the uppermost platform 27 and the lowermost platform 24 are stationary and the two platforms 39 and 45 between these platforms 24 and 27 are rotatable around the central shaft 23. This arrangement permits the upper stationary platform 27 and the lower stationary platform 24 to be used for mounting cams and other stationary components of the apparatus while the movable platforms 39 and 45 are used to mount those apparatus components necessary to hold and reform in cooperation with stationary components a plurality of shells 22 distributed evenly around the central shaft 23 between the movable platforms 39 and 45.

The nature of the components of the apparatus associated with both stationary platforms 24 and 27 and movable platforms 39 and 45 is most easily understood by first considering those associated with the movable platforms 39 and 45. In turn, the components associated with the two movable platforms 39 and 45 are most easily understood by considering the movable platforms 39 and 45 as being comprised of a plurality of identical shell stations. In the specific embodiment of the apparatus described herein, the shell stations are four in number and a shell station is comprised of radially corresponding pie-shaped fourths 54 of the two movable platforms 39 and 45 and of identical components associated with each of them.

Figure 1:
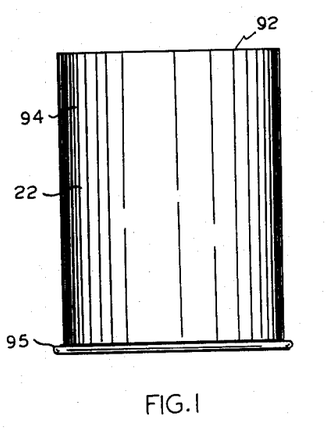
FIGURE 1 is an elevational view of a cylindrical sheet metal shell or blank as it appears prior to the forming of a neck and flange at one end.
Figure 2:
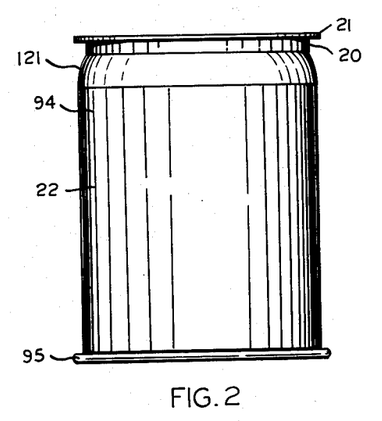
FIGURE 2 is an elevational view of a cylindrical sheet metal shell or blank after the forming of a neck and flange at its upper end.
Figure 3:
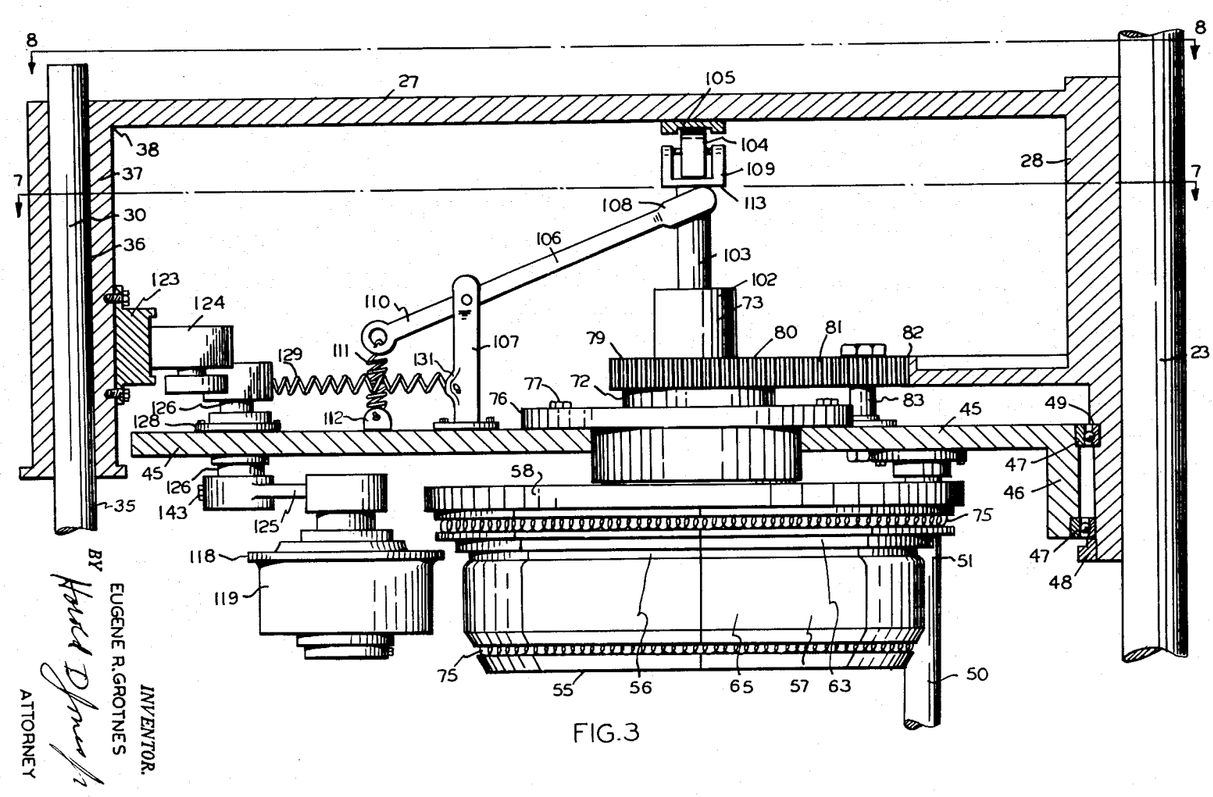
FIGURE 3 is a sectional view taken in a radial line through the upper stationary platform and in a corresponding radial line through the upper movable platform and showing these two platforms in section and the components of the apparatus associated with these two platforms at a shell station, but with unnecessary background details eliminated from the view for purposes of clarity.
Figure 7:
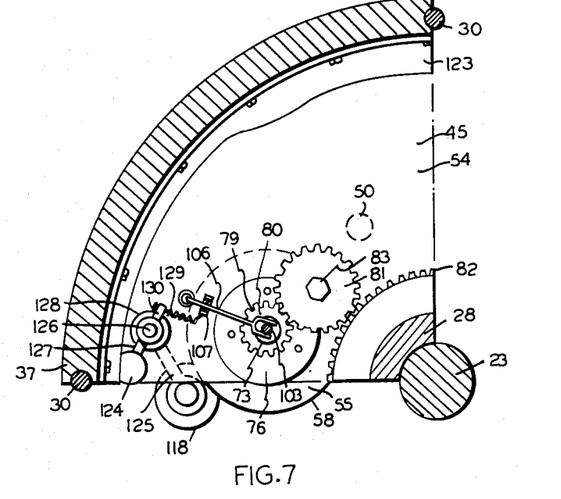
FIGURE 7 is a sectional view of one shell station taken in line 7—7 in FIGURE 3 and showing that portion of the upper movable platform whose radial position about the central shaft momentarily corresponds to the portion of the lower stationary platform shown in FIGURE 5.
Figure 8:
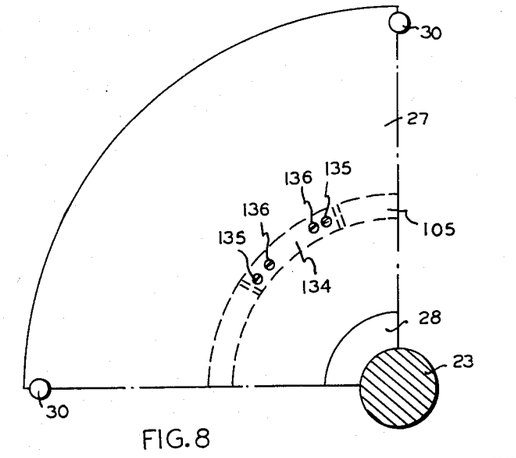
FIGURE 8 is a sectional view taken in line 8—8 in FIGURE 3 and showing that portion of the upper stationary platform whose radial position about the central shaft corresponds to that portion of the lower stationary platform shown in FIGURE 5.

The components associated with the upper movable platform 45 are clearly shown in FIGURES 3 and 7. The major component is the die stack 55 suspended below the upper movable platform 45. This die stack 55 is comprised of upper 56 and lower 57 inner die sets positioned between upper 58, middle 59 and lower 60 die supports. These die supports 58, 59 and 60 are all discs having holes 61 in their centers. In addition, the upper 58 and middle 59 die supports have keys 62 on their lower surfaces and the lower 60 and middle 59 die supports have keys 62 on their upper surfaces. In the specific embodiment of the apparatus described herein, the keys 62 are eight in number on these die supports surfaces and extend along radial lines equally distributed around the centers 61 of the die supports 58, 59 and 60.

The upper 56 and lower 57 inner die sets contain eight dies 63 or 65 each and each die 63 or 65 of each inner die set 56 and 57 has a key way 64 on its top and on its bottom which extends along a radial line bisecting the die 63 or 65. Thus, when the upper inner die set 56 is placed between the upper 58 and middle 59 die supports and properly positioned, a key 62 in the bottom of the upper die support 58 will engage a key way 64 in the top of each upper inner die 63 and a key 62 in the top of the middle die support 59 will engage a key way 64 in the bottom of each upper inner die 63. Similarly, when the lower inner die set 57 is placed between the middle 59 and lower 60 die supports and properly positioned, a key 62 in the bottom of the middle die support 59 will engage a key way 64 in the top of each lower inner die 65 and a key 62 in the top of the lower die support 60 will engage a key way 64 in the bottom of each lower inner die 65.

Figure 9:
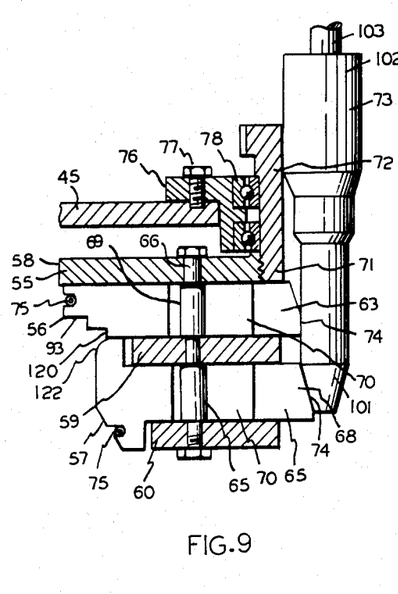
FIGURE 9 is a sectional view of one half of the die stack and supporting structure taken in a radial line extending between dies and showing among other features, the upper, middle and lower die supports in section and the upper and lower inner die sets and camming pin in elevation.
Figure 10:
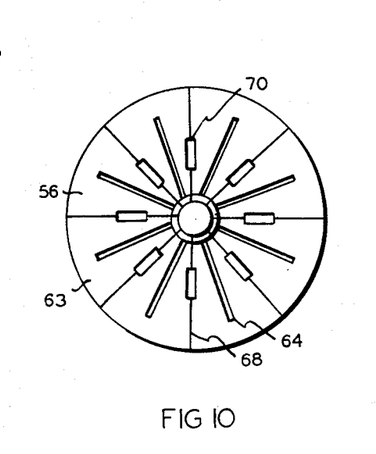
FIGURE 10 is a top plan view of the upper inner die set showing the bolt cut outs and the key ways in each die.
Figure 11:
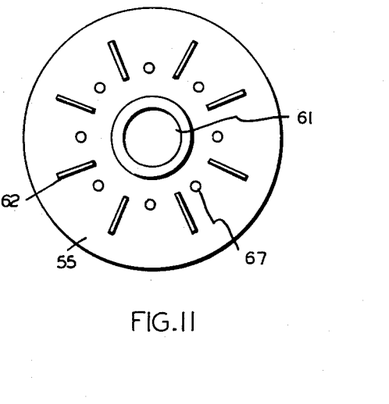
FIGURE 11 is a bottom plan view of the upper die support showing the surface contiguous with the upper inner die set surface shown in FIGURE 10 and the bolt holes and keys.

This die stack 55 of inner die sets 56 and 57 and die supports 58, 59 and 60 is held together by bolts 66 extending between die supports 58, 59 and 60 through matched holes 67 in the die supports 58, 59 and 60 which are evenly distributed around the centers 61 of the supports so that bolts 66 passing through the holes 67 will pass between the sides 68 of the dies 63 or 65 in each inner die set when keys 62 and key ways 64 are properly engaged. Proper vertical spacing of the die supports 58, 59 and 60 to insure the freedom of the inner die sets 56 and 57 to move laterally between the die supports is obtained by using spacer cylinders 69 around the bolts 66 between the die supports 58, 59 and 60. It should be noted that both sides 68 of each die 63 or 65 in the two inner die sets 56 and 57 have a cut out 70 to accommodate the passage of a bolt 66 and spacer cylinder 69 between dies 63 or 65 which is of sufficient length to permit the dies 63 or 65 to move toward and away from the center of the die stack 55 during operation of the apparatus without die 63 or 65 motion being restricted by the spacer cylinder 69. The center of the top die support 58 is attached to the lower end 71 of an inner sleeve 72 through which a camming pin 73 extends down into the center of the die stack 55 and the inner surfaces 74 of the dies 63 or 65 in both inner die sets are held against this camming pin 73 by die springs 75 extending around the periphery of each inner die set 56 or 57.

The inner sleeve 72 is inserted into an outer sleeve 76 which is held by bolts 77 to the upper movable platform 45. Vertical movement of the inner sleeve 72 within the outer sleeve 76 is structurally prevented, but a bearing arrangement 78 is provided between the two sleeves 72 and 76 to permit the free rotation of the inner sleeve 72 within the outer sleeve 76. As a result, the die stack 55 and the camming pin 73 are freely rotatable as a unit inside the outer sleeve 76. Rotation of the die stack 55 is achieved by providing gear teeth 79 around the uppermost circumference of the inner sleeve 72 in order to form a gear integrally associated with the die stack 55. This sleeve gear 80 is connected through an intermediate gear 81 or gear stack to the gear teeth of a gear rack 82 fixedly attached to the inner cylinder 28 of the upper stationary platform 27. Therefore, as the upper movable platform 45 rotates about the central shaft 23, the intermediate gear 81 or gear stack will be driven by the gear rack 82 and will, in turn, drive the sleeve gear 80 to rotate the die stack 55. The intermediate gear 81 or gear stack rotates about a pin 83 extending upward from its attachment point on the upper movable platform 45 and provides a convenient means for varying the amount of rotation of the die stack 55 during a given radial motion of the upper movable platform 45 about the central shaft 23.

Figure 4:
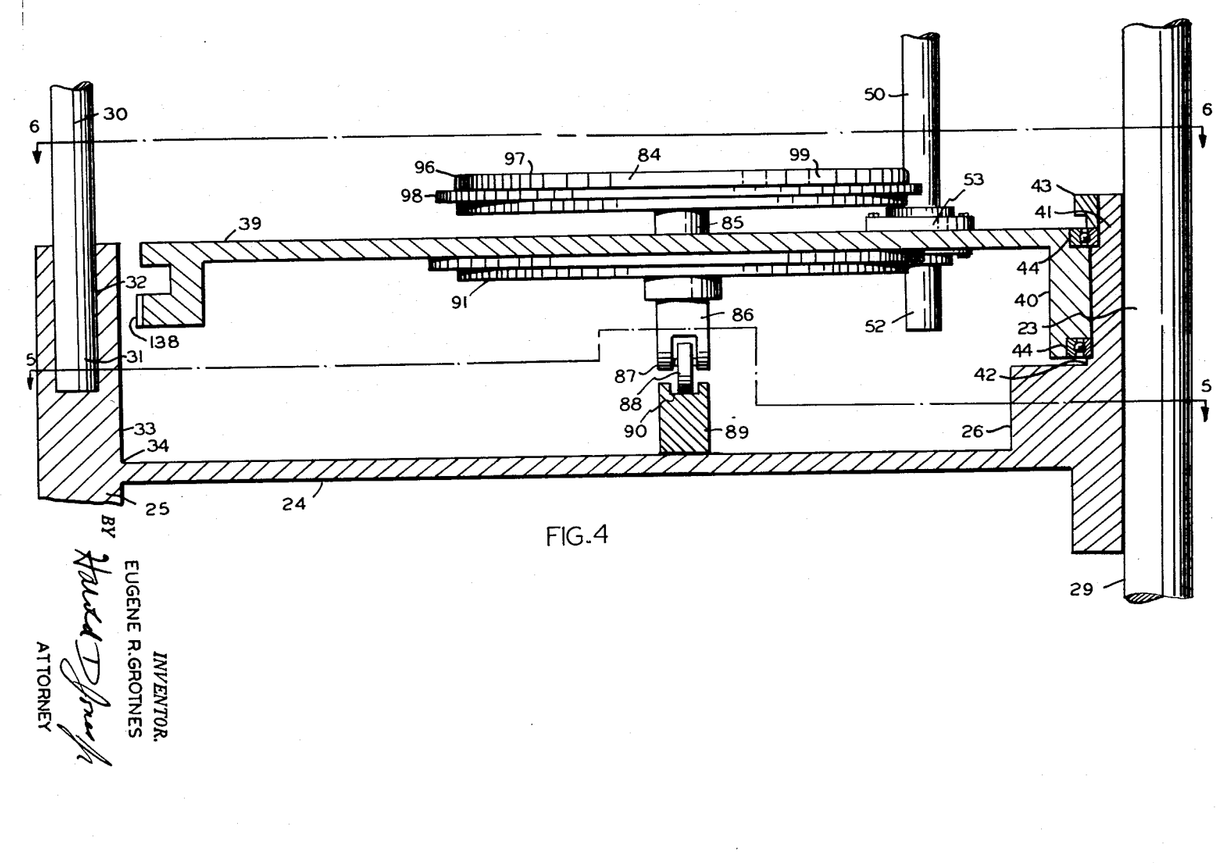
FIGURE 4 is a sectional view taken in radial line through the lower movable platform and in a corresponding radial line through the lower stationary platform and showing these two platforms in section and the components of the apparatus associated with these two platforms at a shell station, but with unnecessary background details eliminated from the view for purposes of clarity.
Figure 5:
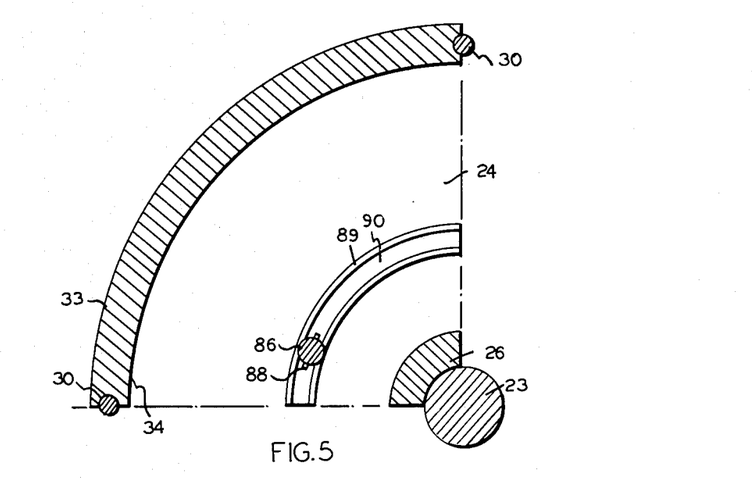
FIGURE 5 is a sectional view taken in line 5—5 in FIGURE 4 and showing a portion of the lower stationary platform.
Figure 6:
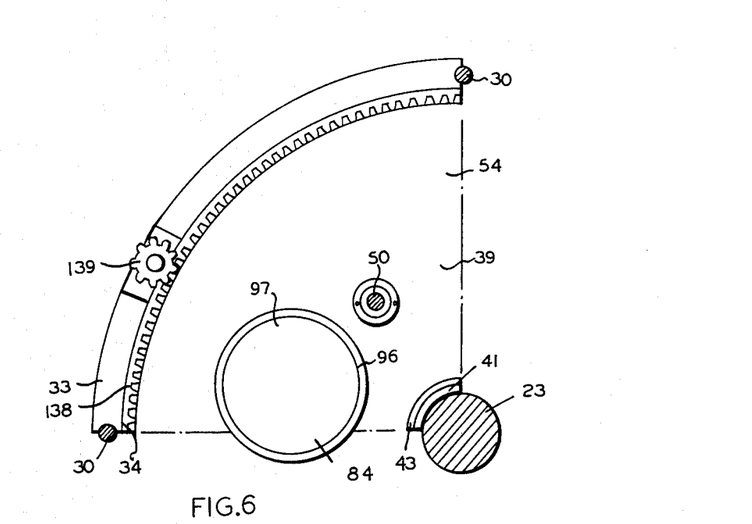
FIGURE 6 is a sectional view of one shell station taken in line 6—6 in FIGURE 4 and showing that portion of the lower movable platform whose radial position about the central shaft momentarily corresponds to the portion of the lower stationary platform shown in FIGURE 5.

Directly below the die stack 55 is the circular shell platform 84 which is rotatably mounted on the upper end 85 of a positioning shaft 86 slidably extending through the lower movable platform 39. At its lower end 87, the positioning shaft 86 is associated with a cam follower 88 which rides on a shell positioning cam 89 fixedly mounted on the lower stationary platform 24. The shell positioning cam 89 is a strip of metal surrounding the central shaft 23 in a circular path which follows the path described by the cam follower 88 of the positioning shaft 86 when this cam follower 88 is moved about the central shaft 23 by rotating the lower movable platform 39. In addition, the thickness of the shell positioning cam 89 varies along its length so that the distance of its camming surface 90 from the lower movable platform 39 varies. Therefore, it can be seen that the cam follower 88 of the positioning shaft 86 rides on the camming surface 90 of the shell positioning cam 89 during rotation of the lower movable platform 39 and that the positioning shaft 86 and shell platform 84 will be moved vertically with reference to the lower movable platform 39.

The foregoing action of the shell positioning cam 89 is utilized to position shells 22 with reference to the die stack 55. This is accomplished by varying the thickness of the shell positioning cam 89 along its length between a minimum and maximum thickness. The minimum thickness is that thickness which will permit the shell platform 84 to drop by gravity into a circular recess 91 in the top surface of the lower movable platform 39 so that the top surface of the shell platform 84 is parallel to the top surface of the lower movable platform 39, and the maximum thickness is that thickness which will force the shell platform 84 upward toward the die stack 55 so that the top circular edge 92 of a shell 22 positioned on the shell platform 84 will engage the check surface 93 of the die stack 55. Thus, when the shell positioning cam 89 is of minimum thickness, a shell 22 can be conveniently placed in position on the shell platform 84 and when the shell positioning cam 89 is of maximum thickness, the top end 94 of the shell 22 is in position around the dies 63 and 65 of the die stack 55. Moreover, it is apparent that the portion of a complete revolution of the lower movable platform 39 about the central shaft 23 during which the shell platform 84 is in each of these positions will depend upon the portion of the length of the shell positioning cam 89 having each of the foregoing thicknesses.

The engaging of the bottom edge 95 of a shell 22 by the shell platform 84 when the shell 22 is placed over the shell platform 84 is improved by rounding the edge 96 of the platform top 97 and by using a flange 98 to actually support the bottom edge 95 of the shell 22. This means of constructing the shell positioning platform 84 not only enables the top 97 of the shell platform 84 to easily rise inside the shell 22, but the portion 99 of the shell platform 84 inserted into the bottom of the shell 22 provides a convenient means for supporting the shell 22 so that it will not tip as the shell platform 84 moves.

The easy entry of the die stack 55 inside the top 94 of the shell 22 as the shell 22 rises is achieved by having the dies 63 or 65 in the die stack 55 contracted toward the center of the die stack by the die spring 75 surrounding the outside circumference of each inner die set 56 or 57 so that the portion of the die stack 55 below the die check surface 93 has a diameter which is less than the inside diameter of the shell 22. In addition, entry of the die stack 55 inside the rising shell 22 is further insured by tapering the faces 100 of the dies 65 in the lower inner die set 57 toward the center line of the die stack 55.

Figure 12:
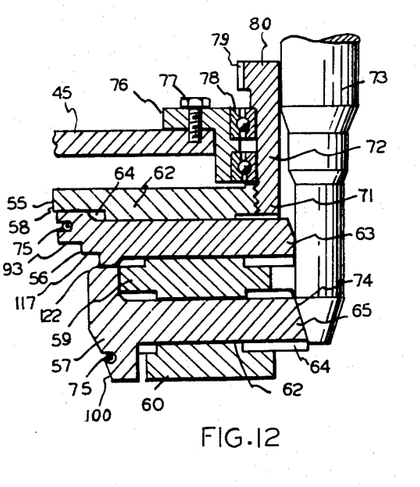
FIGURE 12 is a sectional view of one half of the die stack and supporting structure taken in a radial line extending through the keys of the three die supports and showing the positions of the upper and lower inner die sets and the camming pin prior to the engaging of the inner surface of a shell by either die set.

However, the contraction of the two inner die sets 56 and 57 of the die stack 55 under the influence of the die springs 75 is possible only if the camming pin 73 is withdrawn from the center of the die stack 55 as shown in FIGURES 9 and 12. Therefore, it follows that the camming pin 73 must be in substantially this withdrawn position when the shell platform 84 is raised by the shell positioning cam 89. The apparatus arrangement employed to insure this positioning of the camming pin 73 during raising of the shell platform 84 is best understood by considering the camming pin 73 and the control of its position in detail at this point.

As already noted, the camming pin 73 is slidably positioned by the inner sleeve 72 and the lower end of the camming pin 101 extends into the center of the die stack 55 so that the camming pin 73 center line corresponds to the center line of the die stack 55. At its upper end 102, the camming pin 73 is associated by a thrust bearing with a camming shaft 103. The thrust bearing permits the camming pin 73 to rotate with the die stack 55 and the camming shaft 103 to remain stationary while at the same time permitting the vertical positioning of the camming pin 73 in the die stack 55 to be determined by the up or down movement of the camming shaft 103. Moreover, the thrust bearing positions the camming shaft 103 with respect to a camming pin 73 so that their center lines correspond. In essence, the camming pin 73 and camming shaft 103 form a two segment structure extending upward from the interior of the die stack 55.

At its upper end, the camming shaft 103 is attached to a cam follower 104 and it is the motion of this cam follower 104 which moves the camming shaft 103 and camming pin 73 to permit the contraction of the inner die sets 56 and 57 for shell 22 raising and to perform other operations to be described. Motion of the cam follower 104 of the camming shaft 103 is obtained from a die stack positioning cam 105 which is a metal strip attached to the underside of the upper stationary platform 27 along the circular path described by the cam follower 104 of the camming shaft 103 as the upper movable platform 45 rotates about the central shaft 23. It is apparent that by coordinating the thickness of the die stack positioning cam 105 with the thickness of the shell positioning cam 89, the position of the camming pin 73 in the die stack 55 can be coordinated with the position of the shell 22. Thus, the thickness of a length of the die stack positioning cam 105 is such that when the shell platform 84 is in the recess 91 of the lower movable platform 39 or being raised to or lowered from the position corresponding with the maximum thickness of the shell positioning cam 89 by the shell positioning cam 89, the camming pin 73 and camming shaft 103 are in maximum raised position and the inner die sets 56 and 57 are contracted.

Although the die springs 75 acting upon the faces of the inner dies 63 or 65 tend to cause the dies 63 or 65 to hold the camming shaft 103 and the camming pin 73 in raised position, positive control of camming pin 73 position is provided by a retractor arm 106 pivotly mounted in a support 107 which is in turn mounted on the upper movable platform 45. One end 108 of the retractor arm 106 is forked and engages the cam shaft 103 just beneath the cam follower bracket 109 and the end 110 on the other side of the support 107 is attached by a retracting spring 111 to a clip 112 mounted on the upper movable platform 45. The underside of the cam follower bracket 109 is of such size as to provide a surface 113 against which the forked end 108 of the retractor arm 106 is forced by the retracting spring 111. Thus, the retractor arm 106 acts to raise the camming pin 73 and camming shaft 103 to the vertical position determined by the thickness of the die stack positioning cam 105.

From the foregoing, it is apparent that by the proper selection of the thickness of a length of the die stack positioning cam 105 with respect to the thickness of a corresponding length of the shell positioning cam 89, the raising and lowering of the shell 22 can be accomplished with the camming pin 73 raised and the inner dies 63 and 65 contracted. Moreover, it is apparent that by using various thicknesses of the die stack positioning cam 105 in coordination with the maximum thickness of the shell positioning cam 89, various positions of the inner die sets 56 and 57 in the die stack 55 can be obtained after a shell 22 has been raised to surround the die stack 55. For example, in the specific embodiment of the apparatus described herein, the die stack positioning cam 105 causes the inner die sets 56 and 57 to assume the series of positions necessary to form a neck 20 and flange 21 in a shell 22.

Figure 13:
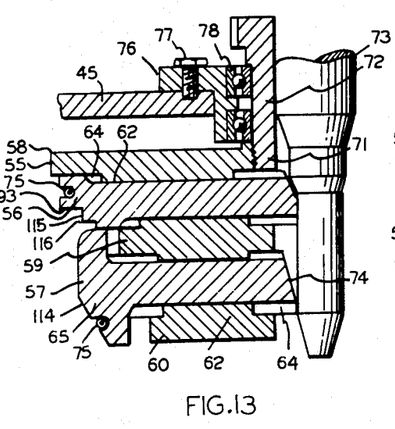
FIGURE 13 is a sectional view of one half of the die stack and supporting structure taken in a radial line extending through the keys of the three die supports and showing the positions of the upper and lower inner dies sets and camming pin after the inner surface of a shell has been engaged by the lower die set, but before it has been engaged by the upper die set.

The forming of a neck 20 and flange 21 is achieved by using three successively increasing thicknesses for the die stack positioning cam 105 in that portion of its length traversed by its associated cam follower 104 as the movable platforms 39 and 45 rotate between the radial position at which the shell positioning cam 89 raises the shell 22 to surround the die stack 55 and the radial position at which it lowers the shell 22. The initial forming thickness of the die stack positioning cam 105 is sufficient to force the camming pin 73 into the center of the die stack 55 the distance shown in FIGURE 13. In this position, the camming pin 73 forces the dies 65 of the lower inner die set 57 outward so that the die faces 114 of this inner die set engage as interior circumferential portion of the shell 22. It should be noted that this action of the camming pin 73 is obtained by the rotation of the movable platforms 39 and 45 between the stationary platforms 24 and 27 and that the same motion is also rotating the die stack 55 because of the action of the gear rack 82 through the intermediate gear 81 on the gear sleeve 80 of the die stack 55. Therefore, it follows that although there is a tendency for the shell 22 and shell platform 84 to rotate as soon as the upper edge 92 of the shell 22 engages the check surface 93 of the rotating die stack 55, the shell 22 and shell platform 84 are positively and firmly rotated when the inner surface of the shell 22 is engaged by the lower inner die set 57 of the rotating die stack 55.

Figure 14:
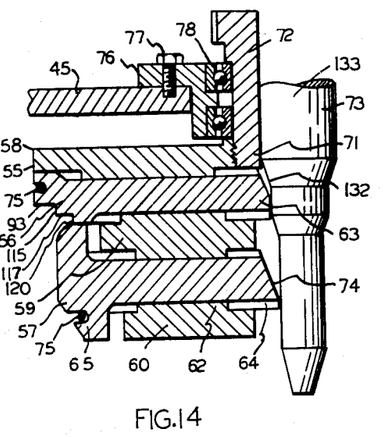
FIGURE 14 is a sectional view of one half of the die stack and supporting structure taken in a radial line extending through the keys of the three die supports and showing the positions of the upper and lower die sets and camming pin when both die sets are engaging the inner surface of the shell during the forming of a neck and flange, but prior to the positive sizing of the neck by the upper die set.

The second forming thickness of the die stack positioning cam 105 follows immediately after the first thickness and is sufficiently greater than the first thickness to force the camming pin 73 into the position shown in FIGURE 14. This position of the camming pin 73 forces the upper inner die set 56 outward so that the outer surface of the faces 115 of the dies 63 in this inner die set engage the interior of the shell 22. Thus, with two successive increases in the thickness of the die stack positioning cam 105, the lower 57 and upper 56 inner die sets have been brought successively into contact with the interior of the shell 22. This progressive engagement of the shell 22 interior insures that the shell 22 is firmly held in position by the lower inner die set 57 before the upper inner die set 56 engages the inside of the upper edge 92 of the shell 22. Therefore, the possibility of the upper edge 92 of the shell 22 being accidently bent outward by the upper inner die set 56 expanding in an improperly positioned shell 22 is eliminated.

Moreover, the successive expansion of the lower 57 and upper 56 inner die sets as described above avoids the possibility that an inward dent in the upper edge 92 of a shell 22 will cause the shell 22 to tip over or be held in improper position by the inner die sets 56 and 57 because the dent is the first part of the shell 22 engaged by the expanding inner dies 63 or 65. As a matter of fact, the positioning of the shell 22 by the lower inner die set 57 prior to the expansion of the upper inner die set 56 enables the expanding upper inner die set 56 to conveniently remove inward dents in the upper shell edge 92 prior to actual forming of the shell neck 20 and flange 21.

In addition, the successive expansion of the lower 57 and upper 56 inner die sets permits the raising of a shell 22 and the expansion of the inner die sets 56 and 57 to occur almost simultaneously if it is desired to increase the number of operations performed by the apparatus within a given portion of the motion of the movable platforms 39 and 45. This is because the lower inner die set 57 can be almost fully expanded while the shell 22 is being raised and yet the outer edge 116 of the flange surface 117 of the upper inner die set 56 will not be in a position where it will be struck by the top edge 92 of the shell 22. Actually, the expanding lower inner die set 57 provides the necessary guidance to insure that the top edge 92 of the shell will be guided past the outer edge 116 of the flange surface 117. Thus, although the successive expansion of the inner die sets 56 and 57 is significant when the inner die sets are expanded after raising the shell 22, this successive expansion is particularly significant when inner die set expansion and shell 22 raising occur at substantially the same time and this latter coordination between inner die 63 and 65 expansion and shell 22 raising is preferred.

In any event, when the upper 56 and lower 57 inner die sets are in the expanded positions described above, the apparatus is in condition for the initial forming operation. This initial forming operation is accomplished by engaging the exterior of the rotating shell 22 with an outer die 118 which is positioned to one side of the die stack 55 and which moves laterally toward the die stack 55 to force the shell 22 inward against the faces 114 and 115 of the inner die sets 57 and 56. The outer die 118 is a circular structure whose outer circumferential surface 119 is opposite in configuration to that portion of the surface formed by the upper and lower inner dies 63 and 65 of the die stack 55 which generally resembles the shell neck 20 and flange 21. Thus, the action of the outer die 118 when forced against the exterior of the shell 22 is to form the shell 22 into the shell neck 20 and flange 21 configuration built into the die stack 55 and which it is desired to form into the shell 22. In essence, the action of the outer die 118 and die stack 55 results in a neck 20 being formed against the neck surface 120 of the upper inner die set 56 and a flange being formed in the extreme end of the shell 22 by the flange surface 117 of the same upper inner die set 56. The original configuration of the rest of the sheel 22 is maintained and the slope 121 of the shell surface into the neck 20 is determined by the upper surface 122 of the lower inner die set 57.

The motion of the outer die 118 toward and away from the die stack 55 is controlled by an outer die positioning cam 123 mounted on the inner surface of the upper stationary platform's outer cylinder 37. Like other positioning cams, the outer died positioning cam 123 extends in a circle around the central shaft 23 and provides positive control over the position of the outer die 118 by its effect on a cam follower 124 associated with the outer die 118. Structurally, the association of the outer die 118 and its cam follower 124 is achieved by rotatably positioning the outer die 118 at one end of a lower arm 125 which at its other end is fixedly attached to the lower end of a shaft 126 and by rotatably positioning the cam follower 124 of the outer die 118 at one end of an upper arm 127 which at its other end is fixedly attached to the upper end of the same shaft 126. The shaft 126 passes through the upper movable platform 45 in a fitting 128 which permits the shaft 126 to rotate but which will not permit it to move vertically.

Thus, it is apparent that the movement of the outer die cam follower 124 by the outer die positioning cam 123 will be transmitted by the upper arm 127, the shaft 126 and the lower arm 125 to the outer die 118. Therefore, the thickness of the outer die positioning cam 123 will determine the lateral position of the outer die 118 with reference to the die stack 55 and the outer die positioning cam 123 will move the outer die 118 against the exterior of the shell 22 when this cam 123 increases in thickness. In the specific embodiment described herein, this increase in the thickness of the outer die positioning cam 123 corresponds in radial position to that length in the die stack positioning cam 105 which forces the camming pin 73 into the position shown in FIGURE 14 to cause the engagement of the interior of the shell 22 by both the upper 56 and lower 57 inner die sets. The outer die cam follower 124 is held in position against the outer die positioning cam 123 by extending the upper arm 127 beyond its point of attachment to the shaft 126 so that a spring 129 can be extended from this extension 130 of the upper arm 127 to a tab 131 on the retractor arm support 107.

From the foregoing, it is apparent that the apparatus provides three cooperating cams 89, 105 and 123 mounted on stationary portions 24 and 27 of the apparatus and which actuate components on movable portions 39 and 45 of the apparatus in a sequence determined by the particular thickness of each cam 89, 105 or 123 during each part of the motion of the movable portions 39 and 45. The versatility of such an apparatus is emphasized by the third increase in thickness of the die stack positioning cam 105. It is this last additional increase in the thickness of the die stack positioning cam 105 which is used to positively position the upper inner die set 56 into exactly that position required to obtain a desired specific diameter of the shell neck 20. The die stack positioning cam 105 obtains the exact required shell neck 20 size by forcing the camming pin 73 deeper into the center of the die stack 55 so that the camming pin 73 position is below that position shown in FIGURE 14.

It can be seen from FIGURE 14 that when this occurs, the sizing surface 132 of the camming pin 73 forces the upper inner die set 56 outward by an amount determined by the exact vertical position of the camming pin 73 and that when this outward motion occurs, an undersized neck 20 will be enlarged to have exactly the shell neck 20 dimension desired. It is readily apparent that the exact shell neck 20 dimension obtainable varies between that obtainable with the camming pin 73 in that position shown in FIGURE 14 to that obtainable if the thickest portion 133 of the camming pin 73 is forced into the center of the upper inner die set 56. In essence, the exact diameter of the shell neck 20 formed is readily adjustable by adjusting the exact distance by which the camming pin 73 is forced into the die stack 55 by this last increase in the thickness of the die stack positioning cam 105.

Figure 15:
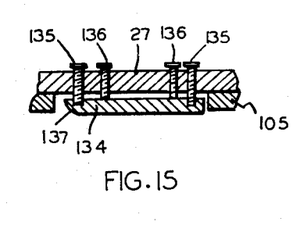
FIGURE 15 is a sectional view of a portion of the die stack positioning cam taken in a center line of the cam and showing the adjustable segment of the cam used to obtain positive sizing of the shell neck by the upper die set.

In order to readily obtain the varying distances of camming pin 73 motion into the die stack 55 which are necessary for various exact shell neck 20 diameters, the third increase in the thickness of the die stack positioning cam 105 is taken from a length 134 of the die stack positioning cam 105 which is adjustably attached to the upper stationary platform 27. Adjustable attachment is accomplished by using two holding screws 135 which hold this length 134 of the die stack positioning cam 105 to the upper stationary platform 27 and two positioning screws 136 which hold this length 134 away from the upper stationary platform 27. It can be readily seen that by the proper adjustment of both sets of screws 135 and 136 this particular length 134 of the die stack positioning cam 105 can be readily increased or decreased in thickness. To assure the smooth entry of the cam follower 104 of the camming shaft 73 onto this sizing length 134 of the die stack positioning cam 105, the length 134 is sloped toward the upper stationary platform 27 at that end 137 by which the length 134 is approached by the cam follower 104 as the movable platforms 39 and 45 rotate.

At this point it should also be noted that the expansion of the upper inner die set 56 in order to expand the shell neck 20 also causes outward movement of the flange surface 117 of the upper inner die set 56. As a result, any portion of the upper edge 92 of the shell 22 which was not formed into the flange 21 when the exterior of the shell 22 was engaged by the outer die 118 will be turned into the plane of the flange 21 by the expansion of the upper inner die set 56. Moreover, this movement of the flange surface 117 of the upper inner die set 56 tends to improve the characteristics of even a well-formed flange 21.

The foregoing description has defined four operative elements of the apparatus. These four elements are a die stack 55 whose inner die sets 56 and 57 are expandable and contractable under the influence of a cam 105 and retractor arm 106, an outer die 118 whose lateral position with reference to the die stack 55 is controlled by a cam 123 and outer die spring 129, a shell platform 84 for positioning the shell 22 with reference to the die stack 55 and outer die 118 and whose motion is controlled by gravity and a cam 89, and means for rotating the die stack 55 and the shell 22 comprised of a stationary gear rack 82 operatively associated with the gear sleeve 80 of the die stack 55. It is readily apparent that the operation of these four operative elements is dependent upon the rotation of the movable platforms 39 and 45 about the central shaft 23 between the two stationary platforms 24 and 27, and that the specific operations performed by the first three named elements will depend upon the exact nature of the particular cam 89, 105 or 123 associated with each element and the relationship of the various cams 89, 105 and 123 to each other. Thus, in addition to forming necks 20 and flanges 21 in shells 22 by the method described, the apparatus is capable of performing a variety of operations when appropriate adjustments are made in the cams 89, 105 and 123.

Moreover, since the operations performed by the apparatus are a function of the radial position of the movable platforms 39 and 45 between the stationary platforms 24 and 27, operations can be successively performed in a plurality of shell stations by arranging identical shell stations at equal distances around the central shaft 23 so that the shell stations successively move through a particular radial position between the stationary platforms 24 and 27 as the movable platforms 39 and 45 revolve about the central shaft 23. Accordingly, the apparatus is not only inherently capable of high production rates because of structural features used at each shell station, but the apparatus is also capable of high production rates because it is possible to reform a plurality of shells 22 with less than a complete revolution of the movable platforms 39 and 45 about the central shaft 23 for each shell 22 reformed.

For example, with the four shell station apparatus described herein and once all four shell platforms 84 are initially loaded, each revolution of the movable platforms 39 and 45 about the central shaft 23 will result in the complete forming of a neck 20 and flange 21 in four shells 22, and with a six shell station apparatus, each revolution of the apparatus will result in the production of six shells 22. Regardless of the number of stations equally distributed about the moving platforms 39 and 45, it is apparent that control of production rates may be maintained by varying the speed with which the movable platforms 39 and 45 revolve about the central shaft 23 between the stationary platforms 24 and 27. As an example, it has been found that with a four shell station apparatus such as that described herein, the production of approximately thirty-six hundred reformed heavy gauge shells 22 per hour is easily obtained by rotating the movable platforms 39 and 45 about the central shaft 23 at the rate of approximately fifteen revolutions per minute. Thus, the circular configuration of the apparatus makes the apparatus take a minimum of floor space while providing for high production rates.

The means used to rotate the movable platforms 39 and 45 between the stationary platforms 24 and 27 may vary. In the specific embodiment described herein, an outer gear rack 138 is associated with the outer edge of the lower movable platform 39 and this outer gear rack 138 is driven by a gear 139 which is in turn driven by any convenient source of power such as an electric motor.

Figure 16:
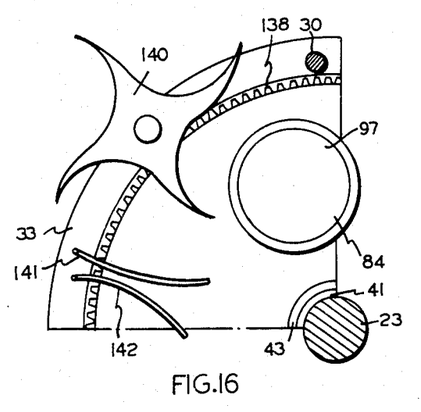
FIGURE 16 is a sectional view of a portion of the lower movable platform taken in a line between this platform and the upper movable platform and showing the star wheel and shell positioning guides used to feed shells on and off the apparatus.
Figure 17:
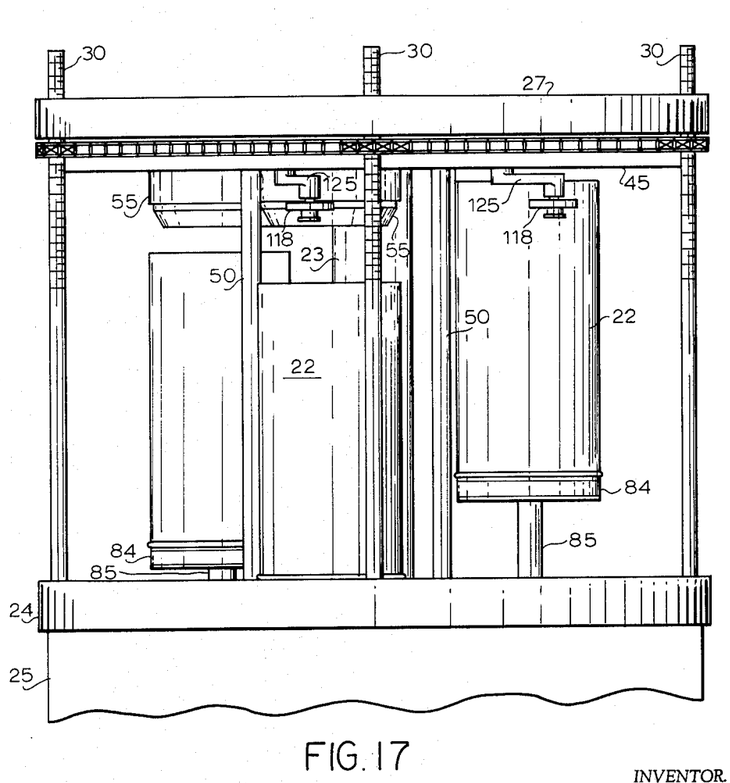
FIGURE 17 is an elevation view similar to FIGURES 3 and 4 and showing the relationship between the upper and lower components of the device.

As shown in FIGURE 16, the outer gear rack 138 may also be used as a driving gear to drive a star wheel 140 which in combination with appropriately placed positioning guides 141 and 142 provides a means for the automatic placing of gravity fed shells 22 over the recessed shell platforms 84 and for shell 22 removal therefrom after a revolution of the movable platforms 39 and 45 and the completion of reforming operations. Specifically, the star wheel 140 is mounted on the outer cylinder 33 of the lower stationary platform 24 and through appropriate gearing is related to the rotation of the lower movable platform 39 so that star wheel 140 will rotate one complete revolution with one complete revolution of the lower movable platform 39. With proper indexing to the outer gear rack 138 and the positions of the shell platforms 84, the star wheel 140 will move shells 22 onto a shell platform 84 each time one of the shell platforms 84 is in the proper spacial relationship to it.

The two positioning guides 141 and 142 are fixedly attached at one end to the outer cylinder 33 of the lower statonary platform 24 and extend out over the surface of the lower movable platform 39. One positioning guide 141 acts in cooperation with the star wheel 140 to accurately guide a shell 22 to the proper position on a recessed shell platform 84 and the other positioning guide 142 simply extends out over the surface of the lower movable platform 39 to the extent that it will engage the side of a reformed shell 22 as the shell 22 moves with the rotating lower movable platform 39 and scoop the shell 22 off the lower movable platform 39.

The versatility of the apparatus with respect to the operations which it is capable of performing has been previously mentioned. However, certain adjustments and changes related to versatility should be considered at this point. As already indicated, the length of the shell 22 which the apparatus is capable of accommodating is readily adjustable by raising the upper platforms 27 and 45 with reference to the lower platforms 24 and 39 in the manner already described. Moreover, die stacks 55 of various overall dimensions can be readily mounted in the outer sleeve 76 and the proper coordination of outer dies 118 of various sizes with a die stack 55 can be easily obtained by adjusting the position of the upper 127 or lower 125 arm on the shaft 126.

For example, if it is desired to use a die stack 55 or an outer die 118 of greater diameter than previously used, it is simply necessary to loosen the set screw 143 of the lower arm 125 and rotate the lower arm 125 about the shaft 126 towards the periphery of the apparatus by the number of radians necessary to obtain the proper positioning of the outer die 118 with reference to the die stack 55 and tighten the set screw 143. It is apparent that if a change in the amount of lateral motion of the outer die 118 is necessary, this can be readily obtained by changing the thickness of the outer die positioning cam 123. Similarly, other operation changes can be made by the changing of the thickness of other cams 89 and 105.

It should be emphasized that variations in the method of camming the various operating elements are readily available. For example, the camming shaft 73 can be retracted by extending the remote end 110 of the retractor arm 106 upward toward the upper stationary platform 27 and using a cam whose thickness is coordinated with that of the die stack positioning cam 105 to provide retracting motion for the camming pin 73. Similarly, the motion of the outer die 118 with reference to the die stack 55 can be controlled by two cams rather than by a cam 123 and a spring 129 by simply using a properly positioned cam whose location and thickness is coordinated with the outer die positioning cam 123 to form a track between which the cam follower 124 of the outer die 118 must move.

It should also be emphasized that by extending the length of the inner sleeve 72 and the camming pin 73 or camming shaft 103 and by making the overall diameter of the die stack 55 sufficiently small to fit inside a shell 22 when the inner die sets 56 and 57 are contracted, the die stack 55 can be positioned inside portions of a shell 22 other than those near the shell edge 92. This modification in die stack 55 structure in combination with an appropriate change in the length of shaft 126 between the upper movable platform 45 and the lower arm 125 will readily permit shell reforming in portions of the shell 22 which are not adjacent to the upper edge 92. The proper positioning of the shell 22 for such reforming operations can be obtained by adjusting the space between upper 27 and 45 and lower 24 and 39 platforms and by adjusting the length of the vertical motion of the shell 22 with changes in the thickness of the shell positioning cam 89.

Similarly, it is possible to use the appartus to reform a shell 22 around less than the full circumference of the shell 22. This is because the rotation of the shell 22 is positively controlled by the motion of the movable platforms 39 and 45 with reference to the inner gear rack 82 and the motion of the outer die 118 is positively controlled by the motion of the movable platforms 39 and 45 with reference to the outer die positioning cam 123. Thus, by selecting the proper length for that thickness of the outer die positioning cam 123 which forces the outer die 118 into engagement with the shell 22, the outer die 118 can be made to engage the shell 22 for less than a full revolution of the shell 22. In summary, these possible modifications and the features of the apparatus as described provide a highly versatile and efficient apparatus for the reforming of sheet metal shells 22 and blanks.

The versatility of the apparatus is further emphasized by its use for the particular method for forming necks 20 and flanges 21 in the sheet metal shells 22 which has been described herein. It has been seen that used in connection with this improved method, the apparatus forms a neck 20 of reduced diameter in the shell 22 and then positively and accurately expands this neck 20 to form a neck having exactly the diameter desired while at the same time improving the form of the flange 21 which was initially formed. Moreover, it has been seen that in accordance with the method disclosed, the degree of expansion of the neck 20 can be readily adjusted to obtain necks 20 having various diameters. This latter feature is particularly signficant since it enables one group of dies to produce a neck 20 in a shell 22 which will accommodate bottoms of various metal gauges.

The method described herein for forming necks 20 in sheet metal shells or blanks 22 to be used for the production of containers is of great significance since it provides a reformed shell or blank having dimensional qualities not readily obtained by existing methods for forming such necks 20. For example, in addition to providing for variations in the exact dimension of the neck 20 in order to accommodate bottoms of various metal gauges, the method provides a neck 20 which is not distorted dimensionally by metal spring back or by any elliptical tendencies.

Although there are other possible arrangements of apparatus by which this method of reforming sheet metal shells or blanks could be accomplished, it is apparent that the apparatus described herein is particularly adapted to such a method. This further enhances the value of the apparatus as an efficient, durable apparatus capable of high production rates with a minimum of maintenance.

What is claimed as invention is:

1. An apparatus for forming a neck in a cylindrical shell comprising, in combination, a lower stationary platform; an upper stationary platform; a central shaft with a length extending vertically between the upper stationary platform and the lower stationary platform; an upper movable platform rotatable about the central shaft and positioned between the upper stationary platform and lower stationary platform adjacent to the upper stationary platform; a lower movable platform rotatable about the central shaft and positioned between the upper movable platform and the lower stationary platform adjacent to the lower stationary platform; a plurality of positioning shafts extending through the lower movable platform at locations in a circumference about the central shaft, each positioning shaft having a lower end extending below the lower movable platform and an upper end; a plurality of shell platforms positioned between the upper movable platform and the lower movable platform, each shell platform having its surface perpendicular to the central shaft and each shell platform being rotatably associated with the upper end of one of the plurality of positioning shafts; a plurality of shell platform cam followers, each shell platform cam follower being associated with the lower end of one of the plurality of positioning shafts; a plurality of outer sleeves extending through the upper movable platform at locations about the central shaft which correspond in radial position and distance from the central shaft with the locations at which the positioning shafts extend through the lower movable platform; a plurality of inner sleeves, each inner sleeve being rotatably inserted within one of the plurality of outer sleeves and each inner sleeve having a lower end extending below its associated outer sleeve and the upper movable platform and an upper end extending above its associated outer sleeve and the upper movable platform; a plurality of die stacks, each stack being fixedly associated with the lower end of one of the plurality of inner sleeves and each die stack having an expandable-contractible upper die set, an expandable-contractible lower die set, and a hollow center; a plurality of sleeve gears, each sleeve gear being fixedly associated with the upper end of one of the plurality of inner sleeves; a plurality of outer dies, each outer die being positioned adjacent to one of the plurality of die stacks for movement toward and away from the die stack; a plurality of camming pins with upper and lower ends, each camming pin being slidably inserted into one of the plurality of inner sleeves with the lower end of the camming pin extending into the hollow center of one of the plurality of die stacks and each camming pin having camming surfaces which engage the upper and lower die sets of the die stack into which its lower end extends; a plurality of camming shafts, each camming shaft being rotatably associated at its lower end with the upper end of one of the plurality of camming pins and each camming shaft having an upper end extending toward the upper stationary platform; a plurality of die stack cam followers, each die stack cam follower being associated with the upper end of one of the plurality of camming shafts; a shell positioning cam mounted upon the lower stationary platform to form a circular path around the central shaft, said shell positioning cam having a surface which contacts the plurality of shell platform cam followers and a dimension extending toward the lower movable platform which varies along its circular path; a die stack positioning cam mounted upon the upper stationary platform in a circular path around the central shaft, said die stack positioning cam having a surface which contacts the plurality of die stack cam followers and having a dimension extending toward the upper movable platform which varies along its circular path and which is adjustable at a particular part of the circular path; means for rotating the upper movable platform and the lower movable platform about the central shaft so that every portion of the upper movable platform always corresponds in radial position about the central shaft with a particular portion of the lower movable platform; means associated with each of the plurality of outer dies for moving each outer die toward and away from the die stack adjacent to the outer die in response to the rotation of the upper movable platform; means for positioning a shell on each of the plurailty of shell platforms when each shell platform is in a particular radial position about the central shaft; and means for removing shells from each of the plurality of shell platforms when each shell platform is in a particular radial position about the central shaft.

2. An apparatus for forming a neck and flange in a cylindrical shell comprising, in combination, a lower stationary platform, an upper stationary platform, a central shaft with a length extending between the upper stationary platform and the lower stationary platform, an upper movable platform rotatable about the central shaft and positioned between the upper stationary platform and lower stationary platform adjacent to the upper stationary platform, a lower movable platform rotatable about the central shaft and positioned between the upper movable platform and the lower stationary platform adjacent to the lower stationary platform, a positioning shaft extending through the lower movable platform and having a lower end extending below the lower movable platform and an upper end, a shell platform positioned between the upper movable platform and the lower movable platform with its surface perpendicular to the central shaft and rotatably associated with the upper end of the positioning shaft, a shell platform cam follower associated with the lower end of the positioning shaft, an outer sleeve extending through the upper movable platform at a location which corresponds in radial position and distance from the central shaft to the location of the positioning shaft, an inner sleeve rotatably inserted within the outer sleeve and having a lower end extending below the outer sleeve and the upper movable platform and an upper end extending above the outer sleeve and the upper movable platform, a die stack fixedly associated with the lower end of the inner sleeve and having an expandable-contractible upper die set, an expandable-contractible lower die set and a hollow center, a sleeve gear fixedly associated with the upper end of the inner sleeve, an outer die positioned adjacent to the die stack for movement toward and away from the die stack, a camming pin with upper and lower ends and which is slidably inserted into the inner sleeve so that the lower end of the camming pin extends into the hollow center of the die stack and which has camming surfaces which engage the upper and lower die sets of the die stack, a camming shaft rotatably associated with the upper end of the camming pin and extending toward the upper stationary platform, a die stack cam follower associated with the upper end of the camming shaft, a shell positioning cam mounted upon the lower stationary platform to form a surface of varying thickness along its length and which contacts the shell platform cam follower, a die stack positioning cam mounted on the upper stationary platform to form a surface of varying adjustable thickness along its length and which contacts the die stack cam follower, means for rotating the upper movable platform and the lower movable platform about the central shaft so that every portion of the upper movable platform always corresponds in radial position about the central shaft with a particular portion of the lower movable platform, means associated with the outer die for moving the outer die toward and away from the die stack in response to the rotation of the upper movable platform, means for positioning a shell on the shell platform when the shell platform is in a particular radial position about the central shaft, and means for removing a shell from the shell platform when the shell platform is in a particular radial position about the central shaft.

3. An apparatus for reforming a shell of a particular length comprising, in combination, a rotatable lower platform, an upper platform rotatable with the lower platform and adjustably positioned a distance from the lower platform which is determined by the particular length of the shell, reforming dies positioned between the upper and lower platforms, means for rotating the upper platform and lower platform, cam means responsive to the rotation of the lower platform for positioning a shell between the upper platform and lower platform in a position where the shell can be engaged by the reforming dies, and means responsive to the rotation of the upper platform for causing the reforming dies to reform the shell.

4. An apparatus for reforming a cylindrical shell having an inner and outer surface wherein the diameter of the reformed portion of the shell is selected from a range of available diameters comprising, in combination, an upper die set having a center line and having a circumferential surface which is selectively expandable and contractible over a range of diameters, a lower die set having a center line which coincides with the center line of the upper die set and having a circumferential surface which is selectively expandable and contractible over a range of diameters, an outer die movably positioned adjacent to the upper and lower die sets so that its circumferential surface can move toward and away from the circumferential surfaces of the upper and lower die sets, means for positioning the shell with its inner surface surrounding the contracted circumferential surfaces of the upper and lower die sets, means for selectively expanding the upper and lower die sets within their ranges of diameters to engage the inner surface of the shell, means for rotating the shell and the upper and lower die sets, means for moving the outer die against the outer surface of the rotating shell and the upper and lower die sets, means for moving the outer die against the outer surface of the rotating shell for that period of time and to the extent necessary to create a reformed portion in the shell having a diameter less than the selected diameter, means for selectively expanding the circumferential surfaces of the upper and lower die sets within their ranges of diameters to give the reformed portion of the shell a diameter equal to the selected diameter, and means for contracting the circumferential surfaces of the upper and lower die sets in order to release the shell.

5. A series of continuously rotatable dies for reforming cylindrical shells comprising an upper die set having a center line and a circumferential surface which is expandable and contractible and a lower die set having a center line which coincides with the center line of the upper die set and a circumferential surface which is expandable and contractible, and means for independently and selectively expanding and contracting said circumferential surfaces of said die sets.

6. The apparatus of claim 3 further comprising a plurality of shafts associated with said upper and lower platforms whereby said upper and lower platforms rotate in unison.

7. The apparatus of claim 3 wherein said upper platform reforming means and said lower platform positioning means are cam-actuated.

8. The apparatus of claim 3 wherein the reforming dies comprise an upper and lower die sets each being independently and selectively expandable and contractible.

9. The die stack of claim 5 wherein said means comprises a camming pin for actuating said die sets.

10. In a series of continuously rotatable die stacks for reforming one end of a cylindrical shell, the combination therewith of upper and lower die means independently and selectively actuated.

11. A continuously rotatable die stack for reforming cylindrical shells comprising an upper die set having a centerline and the circumferential surface which is expandable and contractible and a lower die set having a centerline which coincides with the centerline of the upper die set and a circumferential surface which is expandable and contractible, a camming pin for independently and selectively expanding and contracting said circumferential surfaces of said die sets, and a cam means for actuating said camming pin.

References Cited by the Examiner

UNITED STATES PATENTS

| | | | |
|---|---|---|---|
| 1,355,351 | 10/20 | Norquist | 153—2 |
| 2,281,574 | 5/42 | Gladfelter et al. | 153—59 |
| 2,455,768 | 12/48 | Herman | 153—2 |
| 2,480,721 | 8/49 | Egenolf et al. | 113—120 |
| 2,513,337 | 7/50 | Liebmann | 74—567 |
| 2,720,241 | 10/55 | Calcaterra | 153—73 |
| 2,744,608 | 5/56 | Ardell et al. | 198—22 |
| 2,811,192 | 10/57 | Kradoska | 153—59 |
| 2,826,289 | 3/58 | McBurney et al. | 198—22 |
| 2,897,873 | 8/59 | Mayne | 153—59 |
| 2,931,415 | 4/60 | Laxo | 153—73 |
| 3,004,449 | 10/61 | Feroleto | 74—567 |
| 3,028,827 | 4/62 | Valyi | 113—120 |

CHARLES W. LANHAM, *Primary Examiner.*